April 21, 1953     E. H. HUFFMAN ET AL     2,636,044

RARE EARTH SEPARATION BY ANION EXCHANGE

Filed June 22, 1951

0.100M CITRIC ACID @ pH 1.70

0.100M CITRIC ACID @ pH 2.04

0.0125M CITRIC ACID @ pH 2.10

INVENTORS.
EUGENE H. HUFFMAN
ROBERT L. OSWALT

BY

ATTORNEY.

Patented Apr. 21, 1953

2,636,044

UNITED STATES PATENT OFFICE 2,636,044

RARE EARTH SEPARATION BY ANION EXCHANGE

Eugene H. Huffman and Robert L. Oswalt, Berkeley, Calif., assignors to the United States of America as represented by the United States Atomic Energy Commission Application June 22, 1951, Serial No. 233,088

5 Claims. (Cl. 260—429)

1

This invention relates to a process for the separation of rare earth elements and, more particularly, to an ion exchange process employing rare earth-citrate complex anions for separating rare earth elements from each other.

For many years the separation of rare earth or lanthanide elements has presented great process difficulties and especially the separation of individual members of the group. These difficulties stem from the fact that the chemical and physical properties of the rare earths are so similar that any single operation (fractional crystallization, extraction, etc.) must be repeated an enormous number of times to achieve even a partial separation. Recently, practical methods of separating rare earth elements have been developed using cationic exchange resins. These methods, in essence, automatically repeat a single operation (distribution of a cationic rare earth species between an aqueous phase and a solid resin phase) many times and thus are able to magnify the small distribution differences between each rare earth to such an extent that very complete separations are possible with a minimum expenditure of time and labor.

We have now discovered that under certain specific conditions anionic rare earth species may be formed and that these anionic species may be employed in conjunction with certain anionic exchange resins to effect a very simple and efficient separation of rare earth elements from each other.

It is therefore a principal object of the present invention to provide a simple, practical, and efficient method of separating the rare earth elements from each other.

Another object of the invention is to provide aqueous citrate solutions containing anionic species of rare earth elements for use in anionic separation processes.

A further object of the invention is to utilize the exchange of rare earth-citrate complexes between an anionic exchange resin and a solution to provide a separation of rare earth elements.

Other objects and advantages will become apparent from the following description considered together with the attached drawing, in which.

2

Figure 1:
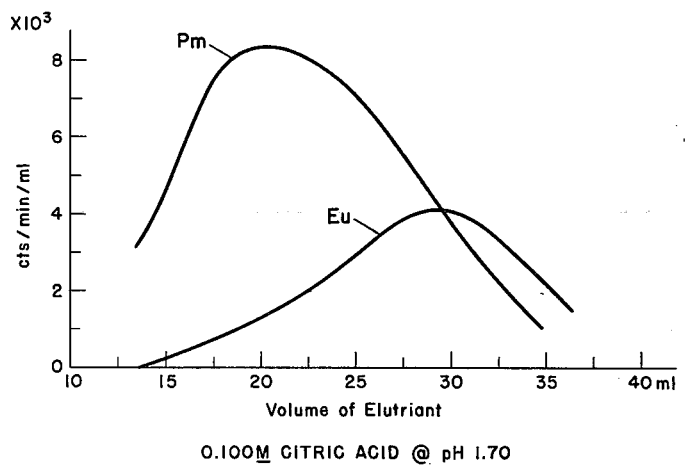
Figure 1 is a graph illustrating the elution of promethium and europium with 0.100 M citric acid elutriant at a pH of 1.70.

Ion exchange resins constitute essentially an insoluble hydrocarbon matrix bearing a large number of active groups capable of exchanging the ionizable components thereof for other ions of the same sign. Anionic exchange resins of the "strong base type," which are particularly suited for use in the process of the present invention, possess active groups such as quaternary ammonium, substituted guanidinium, etc., in which the ionizable component (e. g., Cl⁻, OH⁻) is capable of being replaced by other anionic species. Strong base type anionic exchange resins, such as those mentioned above, are characterized by showing no hydrolytic effects when placed in aqueous solutions.

As an example of an anion exchange reaction, one may consider the treatment of a strong base type resin (quaternary ammonium active groups) in the chloride form (i. e., Cl⁻ is the replaceable anion) with an aqueous nitrate solution. The reaction which ensues may be represented by the following equation:

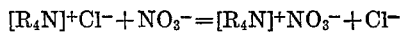

$$[R_4N]^+Cl^- + NO_3^- = [R_4N]^+NO_3^- + Cl^-$$

In this equation, the first and third members represent respectively the chloride and nitrate forms of the resin and have been written to illustrate the ionic bonding between the resin's active groups $[R_4N]^+$ and the replaceable anion. This type of bonding is an inherent characteristic of strong base type resin as differentiated from other ion exchange resins. The net result of the above reaction is that nitrate ions have been removed from solution and adsorbed on the resin by undergoing ion exchange with the resin's replaceable chloride ions. As the completeness of anion exchange reactions is dictated by conventional equilibrium expressions, such reactions may be driven essentially to completion by using an excess of an appropriate reactant.

In the process of the present invention, a portion of finely-divided strong base type anionic exchange resin is placed in a column and converted to the "citrate" form (i. e., the replaceable anions are $H_2Cit^{-1}$, $HCit^{-2}$, and $Cit^{-3}$) by flowing an aqueous solution of citric acid of adjusted pH through the column. A citric acid solution containing anionic rare earth-citrate complexes is then passed through the resin column whereupon the anionic rare earth complexes are adsorbed on the resin preferably near the upper end thereof by replacing the resin adsorbed citrate anions. The adsorbed rare earth complexes are then eluted from the resin column with an elutriant consisting of a citric acid solution of specified pH.

As this eluting solution moves through the resin column, it will present an ever-changing environment (solution phase) to each rare earth anionic complex held by the immobile resin phase. As a consequence of this changing environment, each rare earth complex will undergo many exchanges between the solution and resin phases and, if the flow rate of the elutriant is not too great, each rare earth complex will accumulate in a sharply-defined region or band, which slowly progresses through the column in the direction of flow of the elutriant. The sequence of these bands will be such that those bands containing rare earth species which favor the solution phase will preceed those that contain rare earth species favoring the resin phase. We have found that under certain critical experimental conditions that negligible overlapping of the individual bands may be achieved. Thus by separately collecting those fractions of the elutriant issuing from the resin column and containing the individual bands, highly purified solutions of each rare earth may be obtained.

The two criteria for the successful separation of rare earth elements by the present invention are the formation of anionic rare earth-citrate complexes and the elution of such complexes from an anionic exchange resin with little overlapping of the individual rare earth complex bands. While appreciable amounts of anionic rare earth-citrate complexes can be formed by dissolving soluble trivalent rare earth salts in acidified citric acid solutions of a wide variety of compositions, we have found that operable solution compositions are quite definitely limited to the relatively narrow range of about 1.5 to 3.0 pH values.

While the foregoing range of pH values may be considered the operable range for the whole rare earth series, we have found further that the pH and concentration of the citric acid solution will be within narrower limits in certain cases with particular combinations of rare earths in the original material. For example, with a citric acid concentration of 0.0125 molar and a pH of approximately 2.1 (as determined by a glass electrode) rare earths such as europium and promethium are most advantageously separated.

In the practice of the present invention it has been found desirable to employ citrate solutions of the same composition for each step of the process, i. e., for the conversion of the resin to the citrate form, in the preparation of the rare earth-citrate complex solution, and as the elutriant. Radioactive tracer quantities of the rare earths have been employed to determine the optimum process conditions within the highly critical pH range because of the ease of analyzing the composition of the elutriant issuing from the ion exchange column by radioactive assay. However, batch equilibration tests have demonstrated that the capacity of the resin is sufficient to permit large scale rare earth separations.

The following example demonstrating the separation of promethium from europium further illustrates the process of our invention and its utility in providing individual rare earth values in high purity.

*Example*

Figure 3:
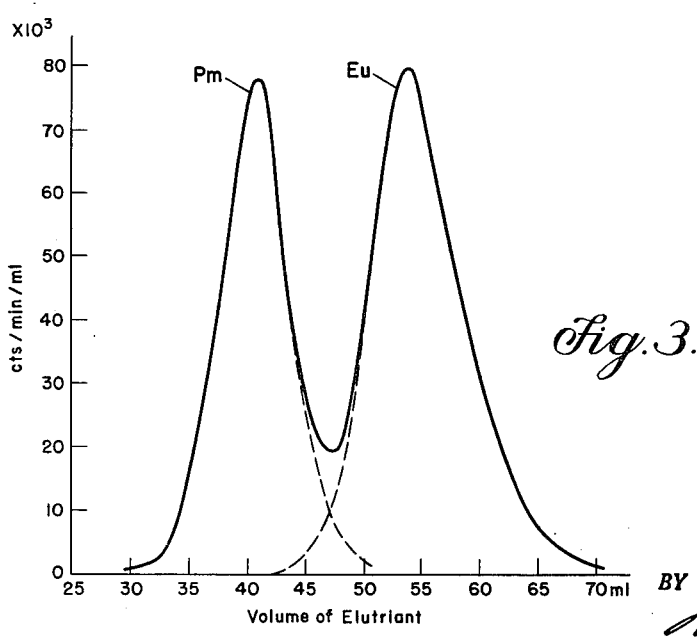
Fig. 3 is a graph illustrating the separation of promethium and europium obtained by elution with a 0.125 M citric acid solution at a pH of 2.10.

A solution of tracer $Pm^{147}$ and $Eu^{154}$ (500,000 counts/min. of each) in 0.25 ml. of 0.0125 molar citric acid adjusted to pH 2.10 with hydrochloric acid was adsorbed on the upper region of a column of 250–500 mesh Dowex A-1 resin (a quaternary ammonium type resin) 14.9 cm. long and 0.08 cm.$^2$ cross section. This resin had been previously converted to the citrate form by treating the original chloride form of the resin with a citrate solution of a similar concentration and pH as that given above. The resin column was then eluted at a rate of 1.5 ml./hr. with a citrate solution of similar composition. Radioactive analysis of appropriate fractions of the elutriant leaving the column yielded the values plotted in the curves of Fig. 3. It is apparent from Fig. 3, than an excellent separation of these rare earths was achieved. It may be noted that the elution is in order of increasing atomic number. This order of elution is the reverse of that obtained by cation exchange methods and is a most advantageous feature as in certain cases a desired rare earth may be eluted first whereas in the cationic process the same rare earth is eluted last.

Figure 2:
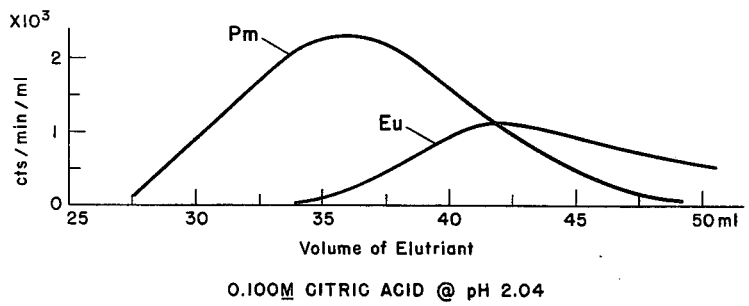
Fig. 2 is a graph illustrating the elution of promethium and europium with 0.100 M citric acid elutriant at a pH of 2.04.

The elution curves shown in Figs. 1 and 2 definitely illustrate the effects of citric acid concentration and pH on the elution behavior of rare earths in the process of the present invention. These curves were obtained under experimental conditions identical to those set forth in the foregoing example except that the amounts of tracer $Pm^{147}$ and $Eu^{154}$ were 20,000 counts/minute each and the composition and pH of the citric acid solution were those indicated therein. From a comparison of Figs. 1, 2, and 3, it is apparent that lowering the pH below the optimum of 2.10 moves the individual rare earth peaks together and that raising the molarity of the citric acid tends to flatten or "smear" the individual peaks.

While the salient features of this invention have been described in detail to one embodiment it will, of course, be apparent that numerous modifications may be made within the spirit and scope of this invention, and it is not therefore desired to limit the invention to the exact details described except insofar as they may be defined in the following claims.

What is claimed is:

1. In a method for separating rare earth elements from each other, the steps comprising adsorbing rare earth-citrate complexes from an acidic aqueous citrate solution on a strong base type anion exchange resin possessing exchangeable citrate anions, and selectively eluting each adsorbed rare earth complex in the order of increasing rare earth atomic number with a citric acid solution having a pH value in the range of about 1.5 to 3.0.

2. The method of preparing anionic resin adsorbable anionic rare earth-citrate complexes in solution which comprises dissolving soluble trivalent rare earth salts in a solution having a composition in the range of 0.005 to 0.150 molar citric acid and a pH in the range 1.50–3.0.

3. In a method for separating rare earth elements from each other, the steps comprising forming rare earth-citrate complex anions in solution by dissolving trivalent rare earth salts in an aqueous citric acid solution having a citric acid concentration in the range 0.005–0.150 molar and acidified to a pH value in the range of 1.50–3.0; contacting an anionic exchange resin in the citrate form with said complex-containing solution whereby the anionic rare earth-citrate are adsorbed on the resin, selectively eluting the adsorbed rare earth complexes with a solution having a 0.005 to 0.150 molar concentration of citric acid and a pH of 1.5 to 3.0, and collecting the individual fractions of the elutriant containing the separated rare earths.

4. The process as defined in claim 3 wherein said rare earths comprise europium and promethium.

5. The process as defined in claim 3 wherein said rare earths comprise europium and promethium, and the elutriant solution comprises 0.125 molar citric acid and a pH of about 2.1.

EUGENE H. HUFFMAN.
ROBERT L. OSWALT.

References Cited in the file of this patent

Tomkins et al.: Jour. Am. Chem. Soc., vol. 69, p. 2769–2770.

Krause et al.: Jour. Am Chem. Soc., vol. 71, pp. 3263 and 3855 (1949).

Huffman et al.: Jour. Am. Chem. Soc. vol. 71, p. 4147.